US007205905B2

United States Patent
Gotzig et al.

(10) Patent No.: US 7,205,905 B2
(45) Date of Patent: Apr. 17, 2007

(54) PARKING ASSISTANCE SYSTEM FOR VEHICLES AND CORRESPONDING METHOD

(75) Inventors: Heinrich Gotzig, Heilbronn (DE); Miguel Hurtado, West Lafayette, IN (US); Nicolas Jecker, Esslingen (DE); Anton Lill, Lauffen (DE)

(73) Assignee: Valeo Schalter und Sensoren GmbH, Bietigheim - Bissingen (DE)

( * ) Notice: Subject to any disclaimer, the term of this patent is extended or adjusted under 35 U.S.C. 154(b) by 138 days.

(21) Appl. No.: 10/490,178

(22) PCT Filed: Feb. 5, 2003

(86) PCT No.: PCT/EP03/01111

§ 371 (c)(1),
(2), (4) Date: Mar. 19, 2004

(87) PCT Pub. No.: WO03/087874

PCT Pub. Date: Oct. 23, 2003

(65) Prior Publication Data

US 2005/0035879 A1  Feb. 17, 2005

(30) Foreign Application Priority Data

Apr. 13, 2002 (DE) .............................. 102 16 346

(51) Int. Cl.
*B60Q 1/48* (2006.01)

(52) U.S. Cl. .................. 340/932.2; 340/444; 340/933; 340/425.5; 414/253; 414/259

(58) Field of Classification Search ............. 340/932.2, 340/936, 938, 943, 903, 435, 436, 437, 444, 340/463–467, 425.5, 901, 902, 933; 180/204, 180/446; 414/253, 259, 260, 261
See application file for complete search history.

(56) References Cited

U.S. PATENT DOCUMENTS

| | | | |
|---|---|---|---|
| 3,898,655 A | | 8/1975 | Tresselt |
| 4,931,930 A | * | 6/1990 | Shyu et al. .................... 701/36 |
| 5,742,141 A | * | 4/1998 | Czekaj ........................ 318/587 |
| 6,061,002 A | * | 5/2000 | Weber et al. ............. 340/932.2 |
| 6,265,968 B1 | * | 7/2001 | Betzitza et al. .............. 340/436 |

(Continued)

FOREIGN PATENT DOCUMENTS

DE    37 28 948    3/1989

(Continued)

*Primary Examiner*—Daniel Wu
*Assistant Examiner*—Daniel Previl
(74) *Attorney, Agent, or Firm*—Paul Vincent

(57) ABSTRACT

The invention relates to a method for operating a parking assistance system for a vehicle, comprising at least one distance sensor that detects at least sections of the lateral immediate vicinity of the vehicle and at least one path sensor that detects the path travelled by the vehicle. According to the method, a control device determines the length and/or width of a parking space from the values measured by the sensors as the vehicle drives past said parking space. The invention is characterised in that the measured length and/or width of the parking space is/are corrected by a correction value and/or that depending on the speed of the vehicle as it drives past the parking space, the measurement is taken by means of the distance sensor at different time intervals.

20 Claims, 4 Drawing Sheets

U.S. PATENT DOCUMENTS 6,483,442 B2 * 11/2002 Shimizu et al. .......... 340/932.2
6,820,711 B2 * 11/2004 Yamada et al. ............. 180/204

FOREIGN PATENT DOCUMENTS

| | | |
|---|---|---|
| DE | 38 44 340 | 7/1990 |
| DE | 43 42 216 | 6/1994 |
| DE | 196 16 447 | 10/1997 |
| DE | 297 18 862 | 12/1997 |
| DE | 201 05 340 | 7/2001 |
| FR | 2 728 972 | 7/1996 |

* cited by examiner

PARKING ASSISTANCE SYSTEM FOR VEHICLES AND CORRESPONDING METHOD

This application is the national stage of PCT/EP03/01111 filed on Feb. 05, 2003 and also claims Paris Convention priority of DE 102 16 346.4 filed on Apr. 13, 2002.

BACKGROUND OF THE INVENTION

The invention concerns a method for operating a parking assistance system for a vehicle, with at least one distance sensor which probes at least regions which are laterally proximate to the vehicle, and with at least one path sensor which detects the path travelled by the vehicle, wherein a control device determines the length and/or width of the parking space from the values of the distance sensor and the path sensor which are detected while passing the parking space. The invention also concerns a parking assistance system and a vehicle.

DE 297 18 862 U1 discloses parking assistance systems of this type. It has turned out that the measured size of the parking space differs from the actual size of the parking space.

It is therefore the underlying object of the invention to further develop a method of the above-mentioned type such that the size of the parking space is determined with maximum accuracy when passing the parking space.

SUMMARY OF THE INVENTION

This object is achieved in accordance with the invention with a method of the above-mentioned type in that the length and/or width of the parking space which is determined in a conventional method is corrected by a correction value in dependence on the lateral distance between the vehicle and the objects bordering the parking space, e.g. two parking vehicles. It has turned out that, due to the non-linear geometry of the radiation lobe of the distance sensor, the actual length of the parking space is not determined, rather a length from the point in time when one parked vehicle leaves the distance sensor lobe to the point in time when the other parked vehicle enters the lobe of the distance sensor. The measuring result is therefore falsified by half the diameter of the lobe when the object exits as well as enters the lobe. For non-cylindrical lobes and different lateral distances from the objects delimiting the parking space, different lengths are measured for the same parking space. In accordance with the invention, correction of the measured length of the parking space with a correction value advantageously completely eliminates the inaccuracy resulting from the radiation lobe specific to the distance sensor.

In accordance with the invention, alternatively or additionally, the measurement is carried out by the distance sensor at different time intervals in dependence on the speed of the vehicle while passing the parking space. To determine the size of the parking space with maximum accuracy, measurement at slow speeds e.g. is carried out in relatively short time intervals. To obtain a first impression of the size of the parking space, measurement while passing the parking space at a higher speed, can be carried out at relatively long time intervals to minimize, in particular, calculation effort, which is then available for other vehicle systems.

The correction value for non-cylindrical radiation lobes preferably depends on the lateral distance between the vehicle and the objects delimiting the parking space. Different correction values are used in dependence on the lateral distance from the objects.

In a preferred embodiment of the invention, the correction value depends on the geometry of the distance sensor lobe. When the geometry of the lobe of the distance sensor is known, the correction value can be determined in a simple fashion in dependence on the distance of the respectively detected object.

In accordance with the invention, the correction value depends linearly on the radial distance between the main radiation direction (the longitudinal axis of the lobe) and the surface of the lobe in the plane where the object delimiting the parking space enters or exits the lobe. The correction value preferably corresponds to the radial distance between the main radiation direction and the point where the respective object exits or enters the lobe.

In an advantageous embodiment of the invention, the correction value has different fixed values in different distance ranges from the objects delimiting the parking space. This is advantageous in that calculation effort can be reduced by providing the fixed values.

It is thereby feasible that a first distance range is in the region between 0 and 1 m from the objects delimiting the parking space. The correction value provided as a fixed value may then e.g. be 0.5 m.

A further distance range may comprise e.g. the distance region between 1 m and 1.2 m between the vehicle and the objects delimiting the parking space. In this case, a fixed correction value may be 0.2 m.

It is also feasible in accordance with the invention that the correction value is 0 when the distance range or the lateral distance between the vehicle and the objects delimiting the parking space is larger than 1.2 m.

When the vehicle travels at a speed of more than 19 km/h, distance sensor measurements are preferably carried out by the distance sensor at time intervals of 20 ms. If the speed of the vehicle is between 10 km/h and 19 km/h, the distance sensor measurement is preferably carried out in time intervals of 40 ms. If the vehicle speed is less than 10 km/h, the measurement is preferably carried out every 100 ms. This produces a very precise measurement at slow vehicle speeds, i.e. during deliberate parking intent.

The distance sensor may e.g. be an ultrasonic sensor, an infrared sensor, a radar sensor or an optical sensor. The path sensor can determine the travelled path using ABS signals, transmission signals, speedometer signals or the like. It may also be part of an ABS system, a transmission system, a speedometer system or the like. This is advantageous in that components which already exist in the vehicle can be used as path sensors.

Means for quantitative and/or qualitative information are provided to inform the driver whether the parking space just passed is large enough for the vehicle. Such means may be display systems or loudspeaker systems.

In a further preferred embodiment of the invention, the distance sensor can be operated in different modi, in particular, as a sensor for an inventive parking assistance system and as a parking assistance system to prevent collisions during parking. This is advantageous in that the same sensor may be used for different functions.

The above-mentioned object is also achieved by a parking assistance system for carrying out the inventive method. A vehicle comprising such a system, also achieves the above-mentioned object.

BRIEF DESCRIPTION OF THE DRAWING

Further advantageous embodiments and details of the invention can be extracted from the following description which explains the invention with reference to the embodiments shown in the drawing.

DESCRIPTION OF THE PREFERRED EMBODIMENT

Figure 1:
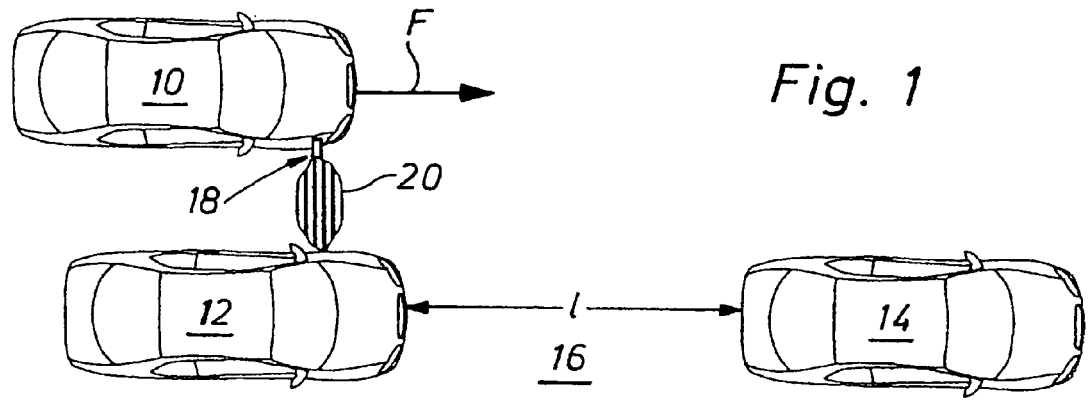
FIG. 1 shows a vehicle with an inventive parking assistance system before passing a parking space.
Figure 2:
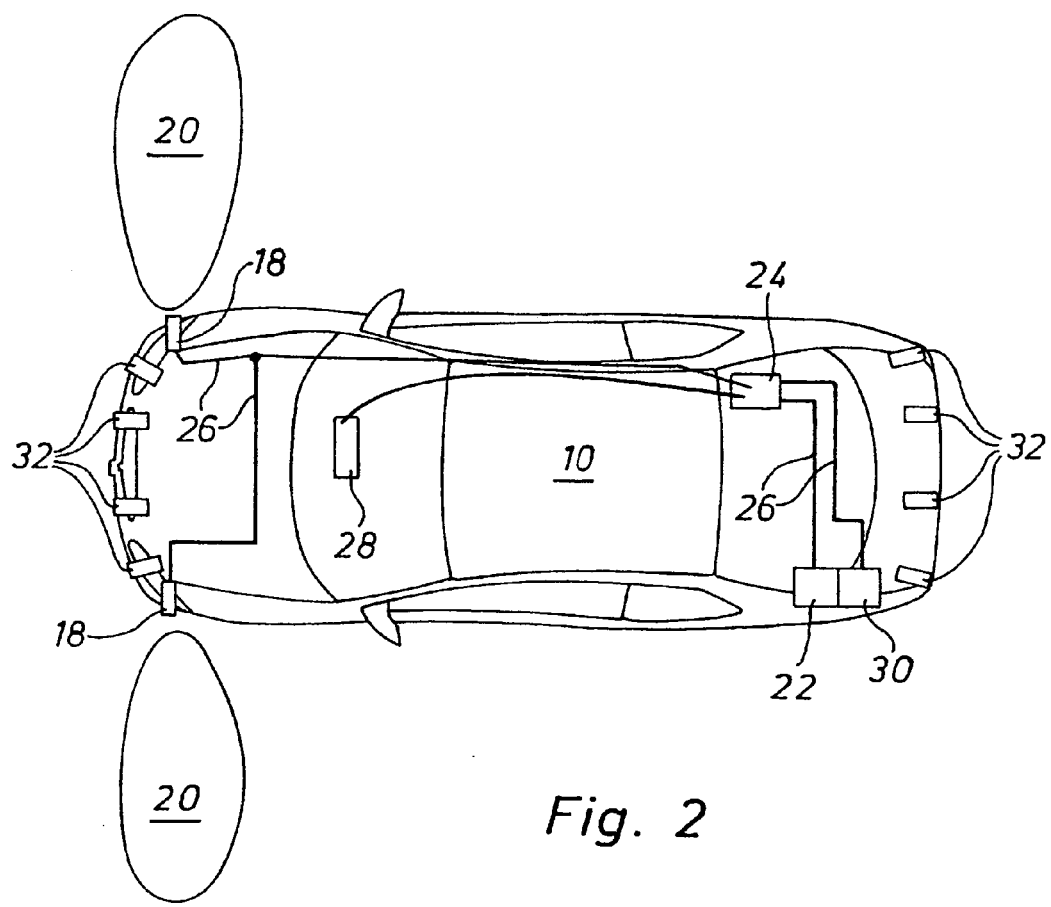
FIG. 2 shows a vehicle with an inventive parking assistance system.

FIG. 1 shows a vehicle 10 which moves in the travel direction F and passes a parked vehicle 12. There is a parking space 16 between a further vehicle 14 and the vehicle 12. The parking space 16 has an actual length l. The vehicle 10 (shown in an enlarged scale in FIG. 2) has one distance sensor 18 at each longitudinal side of the vehicle. The distance sensor 18 detects the lateral proximity of the vehicle. The regions detected by the sensors 18, so-called lobes, are characterized in the figures by reference numeral 20.

The vehicle 10 also has a path sensor 22 which is coupled e.g. to the ABS system, the transmission or the speedometer of the vehicle 10. The vehicle 10 also comprises a control device 24 which is coupled via lines 26 to the distance sensors 18 and the path sensor 22. The control device 24 can determine the length l of the parking space 16 from the distance sensors 18 and the path sensor 22 (see description FIG. 3). The vehicle 10 also has a display 28 connected to the control device 24, which gives the driver information about the size of the parking space 16 after passing by the parking space 16.

In addition to the path sensor 22, the vehicle 10 also has a speed sensor 30 which is coupled to the control device 24. Further distance sensors 32 are provided in the front and rear part of the vehicle, which are part of parking assistance system to warn the driver of collisions with objects present in the proximity of the vehicle when a safety distance has been surpassed.

Figure 3:
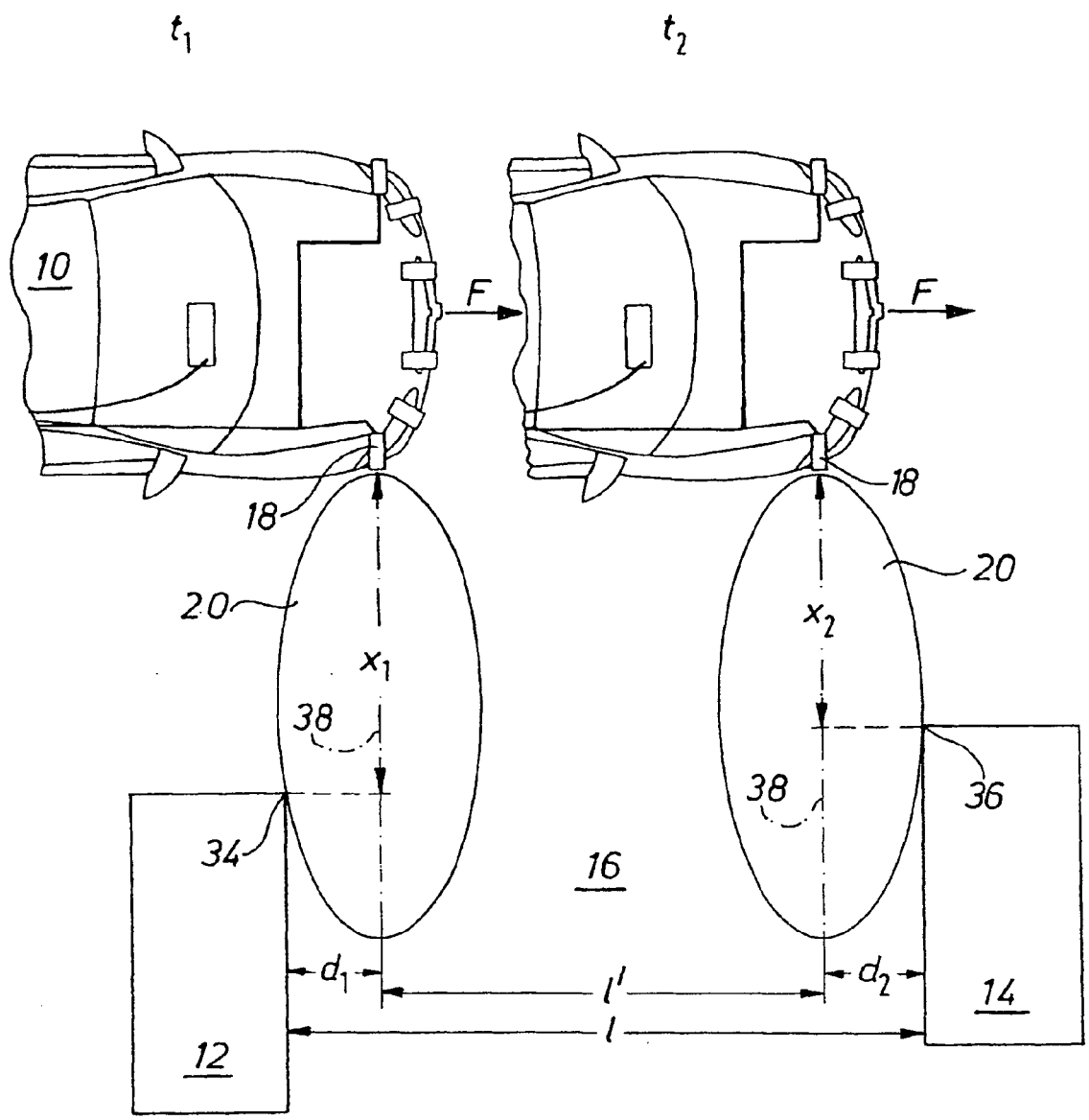
FIG. 3 shows the front section of the vehicle in accordance with FIG. 2 while passing a parking space.

FIG. 3 explains the inventive parking assistance system. The vehicle 10 is shown in two positions, $t_1$ and $t_2$, at different points in time. The two objects 12 and 14 which delimit the parking space are not aligned, rather slightly mutually offset. The object 14 is therefore closer to the passing vehicle than is the object 12.

Prior to time $t_1$, the distance sensor 18 measures the lateral distance $x_1$ from the parked vehicle 12. At the time $t_1$, the corner region 34 of the vehicle 12 leaves the lobe 20 of the distance sensor 18. The distance sensor 18 consequently informs the control device 24 that the parking space 16 starts at $t_1$. At this time $t_1$, the path sensor 22 starts to measure the path travelled up to time $t_2$, at which point in time $t_2$, the corner region 36 of the vehicle 14 enters the lobe 20 of the distance sensor 18. The control device 24 therefore receives the information that the end of the parking space 16 is reached. The length l' is measured as the length of the parking space 16 via the path travelled between the two times $t_1$ and $t_2$.

As is clearly shown in FIG. 3, the length l' does not correspond to the actual length l of the parking space 16.

In accordance with the invention, a correction value k is added to the value l' in order to obtain the actual length l of the parking space 16 from the length l'. In accordance with the embodiment of FIG. 3, the correction value is $k=d_1+d_2$. The length l of the parking space 16 is calculated as follows: $l=l'+(d_1+d_2)$.

The values $d_1$ and $d_2$ can be determined e.g. as follows: The distance $x_1$ of the passing vehicle 10 from the vehicle 12 is determined. The geometry of the lobe surface of the lobe 20 is known. From $x_1$, the distance $d_1$ can be determined, which corresponds to the radial distance from the main radiation direction 38 to the corner region 34 of the vehicle 12. A similar evaluation obtains for the distance $d_2$. At time $t_2$, $d_2$ equals the radial distance from the main radiation direction 38 to the corner region 36 of the vehicle 14.

Due to the fact that the vehicles 12 and 14 are parked such that they are mutually offset, $d_1$ and $d_2$ differ. If the vehicles 12 and 14 are coplanar, the values $d_1$ and value $d_2$ are equal.

The values $d_1$ and $d_2$ can also be estimated. In accordance with the invention, the lateral distance between the vehicles 10 and the vehicles 12 and 14 delimiting the parking space can be separated into three distance ranges. A first distance range extends from 0 to 1 m, a second distance range extends from 1 m to 1.2 m, and a third distance range comprises distances of more than 1.2 m. If the vehicles 12 and 14 are in the first distance range, a general correction value of approximately 0.5 m may be provided, which includes the two values $d_1$ and $d_2$. If the lateral distance between the vehicle 10 and the vehicles 12 and 14 is between 1 m and 1.2 m, a general correction value may be 0.2 m. If the corresponding distance is more than 1.2 m, the correction value may be 0.

Figure 4:
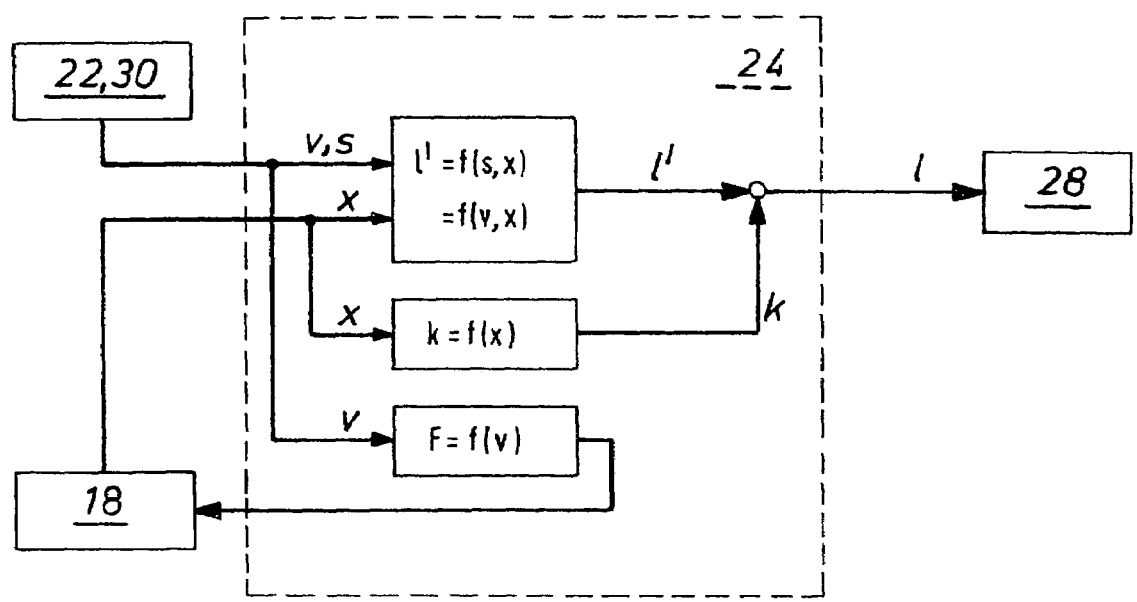
FIG. 4 shows a flow chart of an inventive parking assistance system.

FIG. 4 schematically shows the inventive method for operating the parking assistance system. The distance sensor 18 measures the lateral distance between the vehicle 10 and the objects 12, 14 present in the lobe 20. This value x is communicated to the control device 24. If x is correspondingly large, i.e. if a parking space is detected, the path sensor 22 or the speed sensor 30 measures the path or the speed of the vehicle until the distance sensor 18 detects an object 14. The measurement produces a length l' of the parking space. l' is thereby a function of the path s travelled and of the detected distance x, or a function of the travelled speed and the detected distance x, i.e.: $l'=f(s,x)$ or $l'=f(v,x)$. To obtain the actual length l of the parking space, the value l' is corrected with a correction value k. The correction value k is thereby a function of the distance x from the objects 12, 14 delimiting the parking space 16, i.e. $k=f(x)$. The actual length l of the parking space is calculated as follows: $l=l'+k$. This length l is displayed to the driver, in a qualitative or quantitative fashion, via display 38.

To ensure exact measurement of the parking space 16, the measurement is carried out by means of the distance sensor 18 at different time intervals depending on the speed v of the vehicle 10 during passage by the parking space 16. The measuring frequency $f$ is consequently a function of the speed v of the vehicle 10, i.e. $f=f(v)$. If the vehicle speed is more than 19 km/h, the measurement can be carried out e.g. every 20 ms. If the vehicle speed is between 10 km/h and 19 km/h, time intervals of 40 ms are favorable. In a particularly advantageous fashion, time intervals of 100 ms for distance sensor 18 measurements are favorable when the vehicle speed is less than 10 km/h.

Figure 5A:
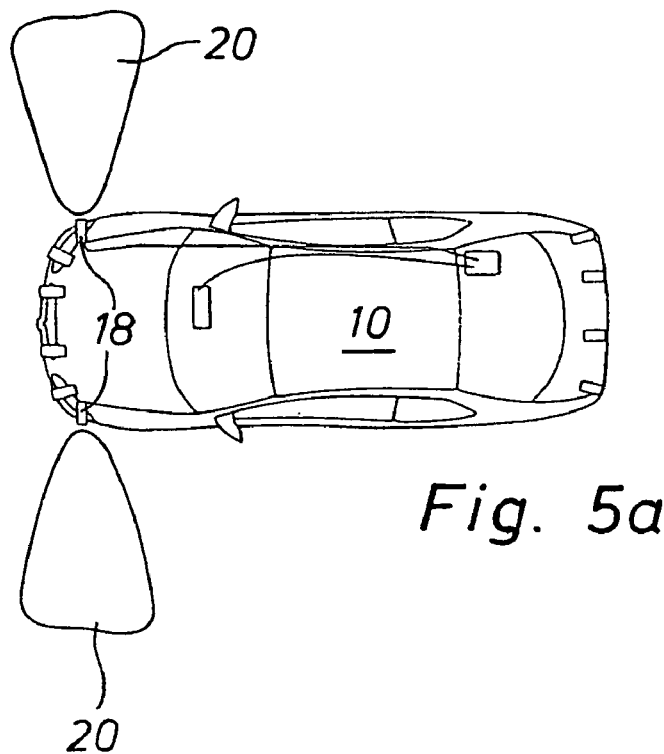
FIGS. 5a and 5b show a vehicle, wherein the inventive parking assistance system is operated in two different modi.
Figure 5B:
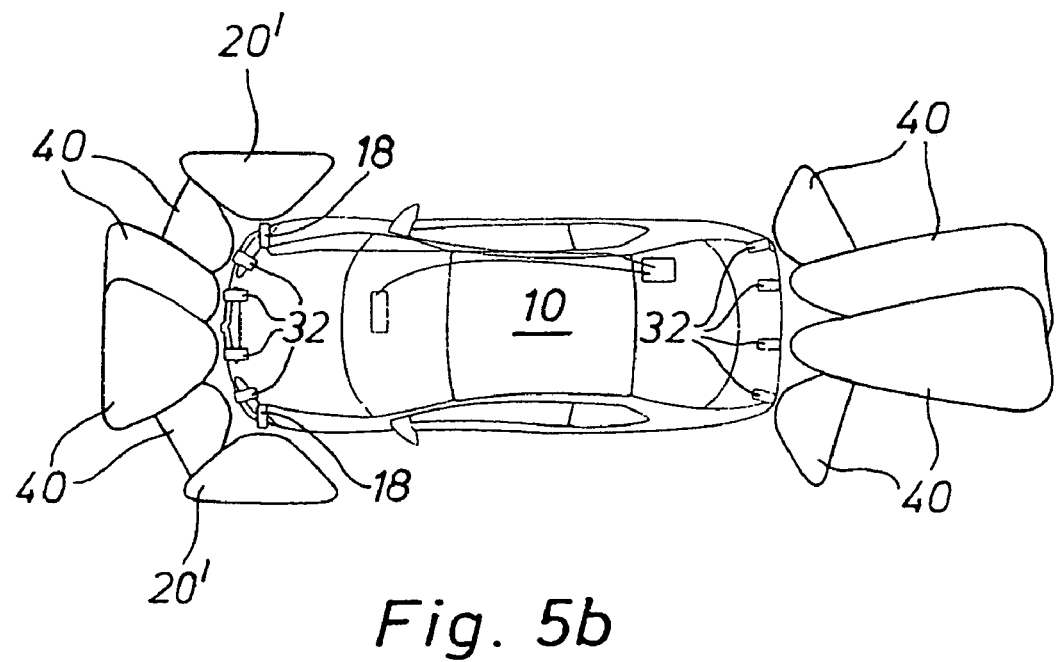

FIG. 5a shows the vehicle 10, wherein the distance sensors 18 are part of an inventive parking assistance system to determine the size of a parking space. The distance sensors 18 can, however, also be part of a parking assistance system to prevent collisions during parking (see FIG. 5b). The distance sensors 18 are thereby operated in another modus, e.g. the control device 24 is operated using other appropriate software to detect the proximity 20'. The distance sensors 32 detect the regions 40. This is advantageous in that the distance sensors 18 can be used for different tasks without requiring additional components.

Changing operation of the sensors 18 between the two modi is advantageous. The alternating frequency may be relatively high such that a suitable parking space is searched and collision with an object reaching proximity is prevented.

All features shown in the description, the following claims and the drawings, may be essential to the invention individual or collectively in arbitrary combination.

We claim:

1. A method for operating a parking assistance system for a vehicle, the method comprising the steps of:
   a) moving the vehicle past a parking space;
   b) measuring, during step a), distances within a lateral region proximate the vehicle using at least one distance sensor;
   c) measuring, during step a), a path length travelled by the vehicle using at least one path sensor;
   d) determining at least one of a length and width of the parking space using results of steps b) and c); and
   e) correcting the results of step d) by a correction value which is dependent on the measurements of at least one of step b) and step c), step b) being repeatedly carried out as the vehicle passes by the parking space, wherein a time interval between successive executions of step b) is decreased in response to an increase in the speed of the vehicle.

2. The method of claim 1, wherein said correction value depends on a lateral distance between the vehicle and objects delimiting the parking space.

3. The method of claim 2, wherein said distance sensor has non-cylindrical radiation lobes.

4. The method of claim 1, wherein said correction value depends on a geometry of a lobe of said distance sensor.

5. The method of claim 1, wherein said correction value depends linearly on a radial distance between a main radiation direction and a surface of a lobe of the distance sensor at a point of exit and entry of an object delimiting the parking space into and out of the lobe.

6. The method of claim 1, wherein said correction value is a constant value for a given range of distances from objects delimiting the parking space.

7. The method of claim 6, wherein said correction value is 0.5 m when a lateral distance between the vehicle and objects delimiting the parking space is less than 1 m.

8. The method of claim 1, wherein said correction value is 0.2 m when a lateral distance between the vehicle and objects delimiting the parking space is between 1 m and 1.2 m.

9. The method of claim 1, wherein said correction value is zero when a lateral distance between the vehicle and objects delimiting the parking space is more than 1.2 m.

10. The method of claim 1, wherein step b) is carried out by said distance sensor at time intervals of 20 ms when a vehicle speed is more than 19 km/h.

11. The method of claim 1, wherein step b) is carried out by said distance sensor at time intervals of 40 ms when a vehicle speed is between 10 km/h and 19 km/h.

12. The method of claim 1, wherein step b) is carried out by said distance sensor at time intervals of 100 ms when a vehicle speed is less than 10 km/h.

13. The method of claim 1, wherein said distance sensor is at least one of an ultrasonic sensor, an infrared sensor, a radar sensor, and an optical sensor.

14. The method of claim 1, wherein said path sensor receives input values as at least one of ABS signals, transmission signals, and speedometer signals.

15. The method of claim 1, wherein said path sensor is part of one of an ABS system, a transmission system, and a speedometer system.

16. The method of claim 1, further comprising means for quantitative or qualitative communication to a driver as to whether or not parking of the vehicle into the parking space is possible.

17. The method of claim 1, wherein said distance sensor is operated in different modi.

18. The method of claim 17, wherein said distance sensor is operated to prevent collisions during parking.

19. A parking assistance system for carrying out the method of claim 1.

20. A vehicle comprising the parking assistance system of claim 19.

* * * * *